(12) United States Patent
Kobayashi

(10) Patent No.: US 12,516,621 B2
(45) Date of Patent: Jan. 6, 2026

(54) METHOD OF PRODUCING ENGINE

(71) Applicant: SUBARU CORPORATION, Tokyo (JP)

(72) Inventor: Kazuma Kobayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/217,821

(22) Filed: May 23, 2025

(65) Prior Publication Data

US 2025/0382910 A1    Dec. 18, 2025

(30) Foreign Application Priority Data

Jun. 17, 2024   (JP) ................................. 2024-097754

(51) Int. Cl.
| | |
|---|---|
| *F02B 19/16* | (2006.01) |
| *F02B 19/08* | (2006.01) |
| *F02B 19/12* | (2006.01) |
| *F02B 19/18* | (2006.01) |

(52) U.S. Cl.
CPC .............. *F02B 19/16* (2013.01); *F02B 19/08* (2013.01); *F02B 19/12* (2013.01); *F02B 19/18* (2013.01)

(58) Field of Classification Search
CPC .......... F02B 19/08; F02B 19/12; F02B 19/16; F02B 19/18; Y10T 29/49231
See application file for complete search history.

(56) References Cited

U.S. PATENT DOCUMENTS

| | | | | |
|---|---|---|---|---|
| 1,417,133 | A | * 5/1922 | Berg | F02B 19/12 123/263 |
| 2,696,199 | A | * 12/1954 | Schmidt | F02B 19/14 123/268 |
| 4,029,072 | A | * 6/1977 | Goto | F02F 1/242 123/655 |
| 5,293,851 | A | * 3/1994 | Schaub | F02M 21/0275 123/259 |
| 5,664,540 | A | 9/1997 | Matsuoka et al. | |
| 2012/0279469 | A1 | * 11/2012 | Weinrotter | F02C 7/264 123/143 B |
| 2020/0165962 | A1 | * 5/2020 | Takada | H01T 13/54 |

FOREIGN PATENT DOCUMENTS

| | | |
|---|---|---|
| JP | H7-293249 A | 7/1995 |
| WO | WO-2011138087 A2 * 11/2011 | .............. F02B 23/08 |

* cited by examiner

Primary Examiner — Matthew P Travers
(74) Attorney, Agent, or Firm — TROUTMAN PEPPER LOCKE LLP

(57) ABSTRACT

A method of producing an engine including a partition member, a spacer, and a spark plug includes: a first step of attaching the spacer to an inside of a body of the partition member by screwing a first external thread of the spacer and an internal thread of the body of the partition member to each other; and a second step of, after the first step, attaching the spark plug to the partition member by screwing a second external thread of the spark plug and the internal thread of the body of the partition member to each other.

4 Claims, 5 Drawing Sheets

METHOD OF PRODUCING ENGINE

CROSS-REFERENCE TO RELATED APPLICATIONS

The present application claims priority from Japanese Patent Application No. 2024-097754 filed on Jun. 17, 2024, the entire contents of which are hereby incorporated by reference.

BACKGROUND

The disclosure relates to a method of producing an engine including an auxiliary chamber.

For example, Japanese Unexamined Patent Application Publication (JP-A) No. H7-293249 discloses an engine including an auxiliary chamber. In JP-A No. H7-293249, an auxiliary-chamber structural body that forms the auxiliary chamber includes an upper member and a lower member that are each divided into two parts in a direction intersecting a central axis of a cylinder.

SUMMARY

An aspect of the disclosure provides a method of producing an engine. The engine includes a partition member separating an auxiliary chamber from a main combustion chamber. The spacer is disposed in an inside of the partition member. The spark plug is mounted to the partition member. The partition member includes a cylindrical body, a hemispherical-shell-shaped end portion that is disposed at an end of the body, a first concave surface that is disposed at an inner surface of the end portion of the partition member, and an internal thread that is disposed on an inner peripheral surface of the body. The spacer has a second concave surface that is disposed on a side facing the first concave surface of the end portion of the partition member, and a first external thread that is disposed on an outer peripheral surface of the spacer and that is screwable to the internal thread of the body. The spark plug has a second external thread that is disposed on an outer peripheral surface of the spark plug and that is screwable to the internal thread of the body. The method includes: a first step of attaching the spacer to an inside of the body of the partition member by screwing the first external thread of the spacer and the internal thread of the body of the partition member to each other; and a second step of, after the first step, attaching the spark plug to the partition member by screwing the second external thread of the spark plug and the internal thread of the body of the partition member to each other.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
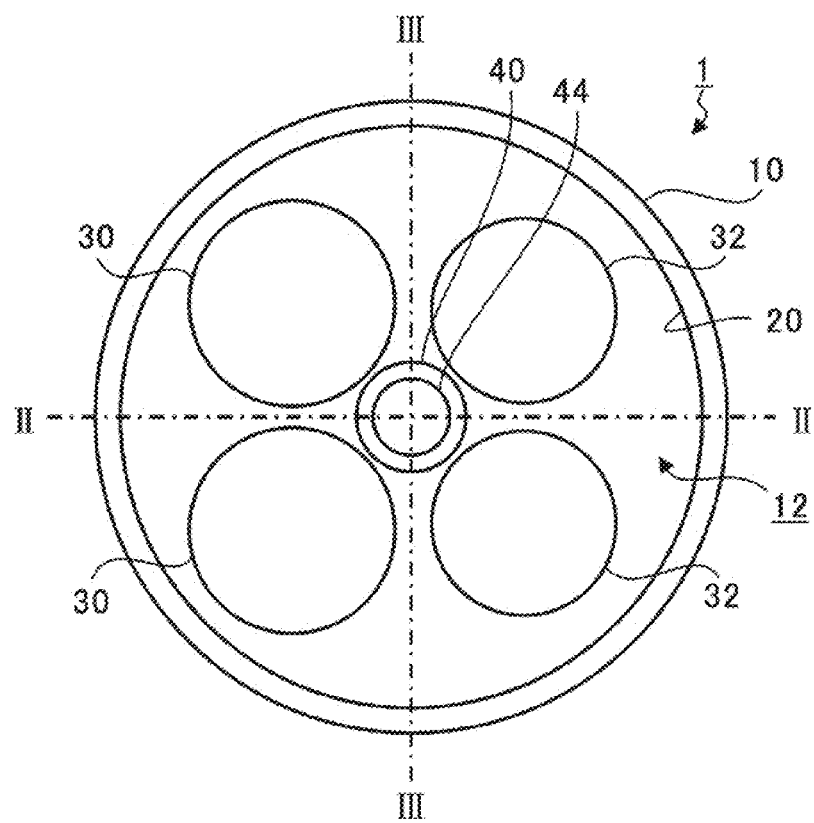
FIG. 1 is a schematic top view schematically illustrating a structure of an engine according to an embodiment of the disclosure.

In an engine including an auxiliary chamber, there is a desire to form the auxiliary chamber with a shape close to a spherical shape. An example of a method of producing the engine is a method of forming the auxiliary chamber by, for example, casting using a sand core or laser welding. However, in these producing methods, production costs are increased.

It is desirable to provide a method of producing an engine that makes it possible to suppress an increase in production costs.

An embodiment of the disclosure is described in detail below with reference to the attached drawings. Specific dimensions, materials, numerical values, and the like in the embodiment are merely exemplifications for making it easier to understand the disclosure, and, unless otherwise indicated, do not limit the disclosure. Note that in the specification and the drawings, elements having substantially the same functions and structures are given the same reference numerals to omit overlapping descriptions, and elements that are not directly related to the disclosure are omitted.

Structure of Engine

Figure 2:
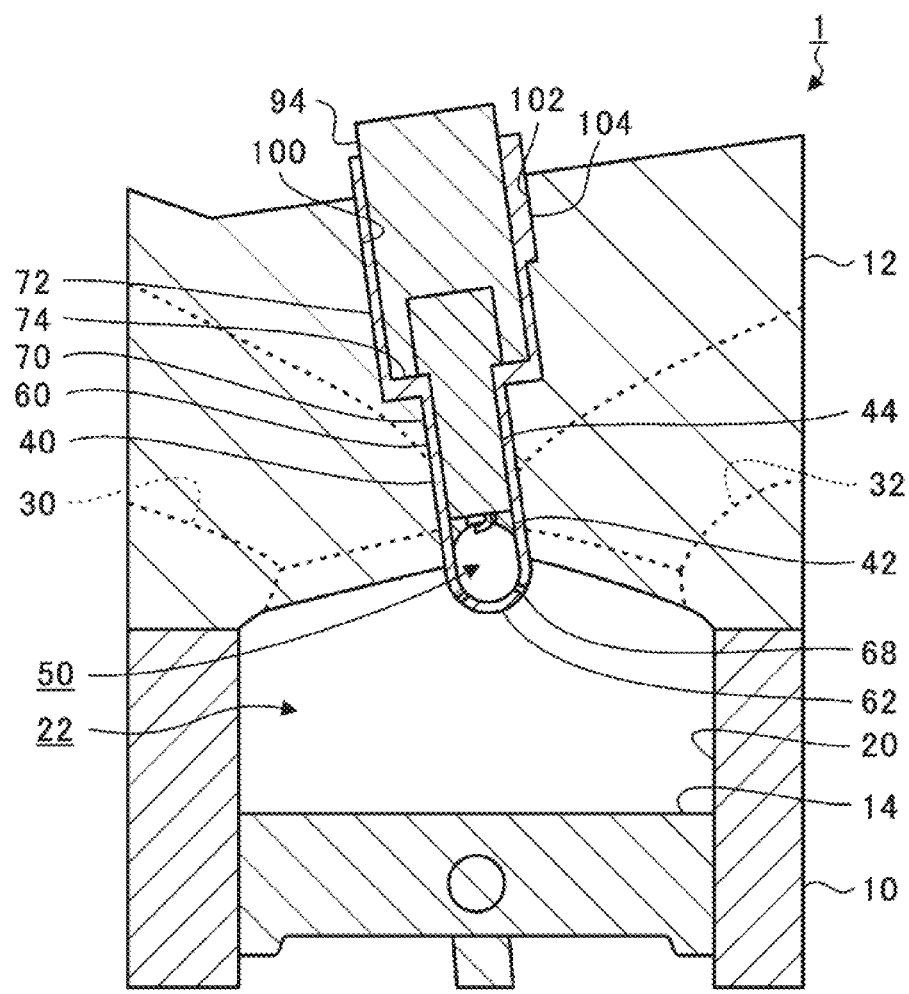
FIG. 2 is a first sectional view of the engine according to the embodiment along line II-II in FIG. 1.
Figure 3:
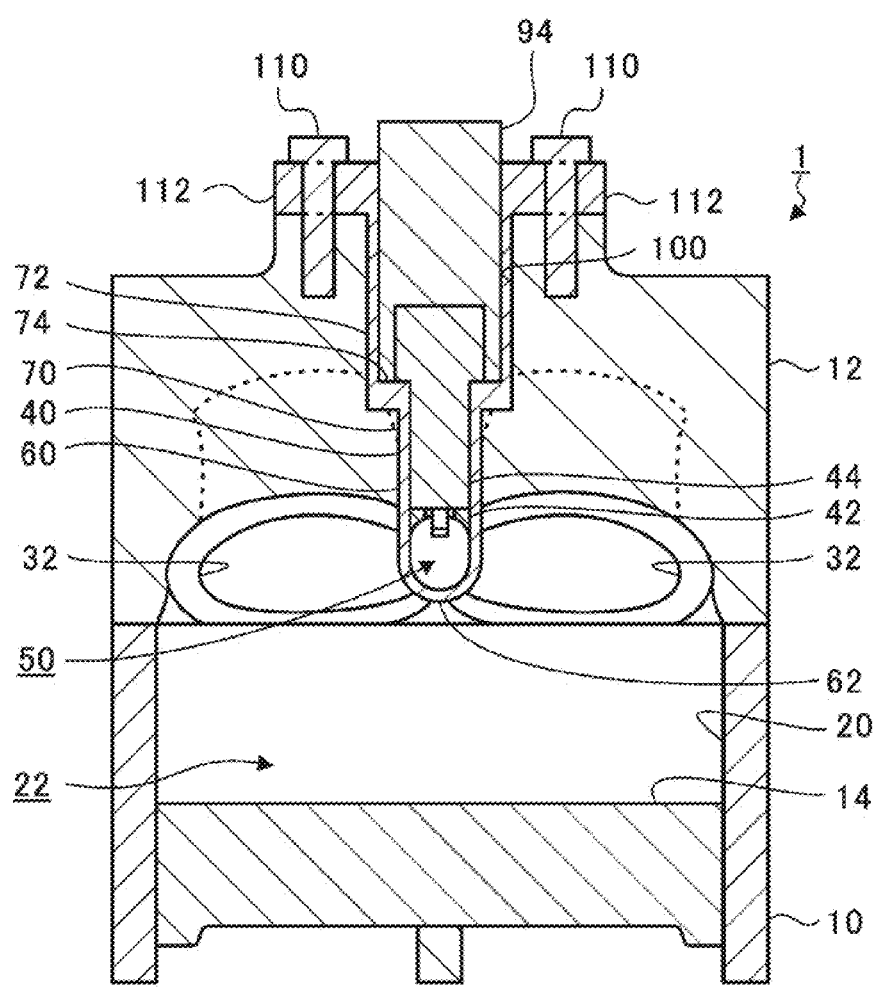
FIG. 3 is a second sectional view of the engine according to the embodiment along line III-III in FIG. 1.

FIG. 1 is a schematic top view schematically illustrating a structure of an engine 1 according to an embodiment. FIG. 2 is a first sectional view of the engine 1 according to the embodiment along line II-II in FIG. 1. FIG. 3 is a second sectional view of the engine 1 according to the embodiment along line III-III in FIG. 1.

The engine 1 is, for example, a reciprocating engine, and generates power by combustion of an air-fuel mixture. For example, the engine 1 may be installed in a vehicle and used as a drive source of the vehicle.

As illustrated in FIGS. 1 to 3, the engine 1 includes a cylinder block 10, a cylinder head 12, and a piston 14. The cylinder block 10 includes one or more cylinders 20. In FIGS. 1 to 3, for convenience of explanation, one cylinder 20 is exemplified. The cylinder head 12 is coupled to the cylinder block 10 so as to cover the cylinder 20. The piston 14 is swingably accommodated in the cylinder 20.

A space surrounded by the cylinder 20, the piston 14, and the cylinder head 12 is a main combustion chamber 22 of the engine 1.

The cylinder head 12 has intake ports 30 and exhaust ports 32. For example, as illustrated in FIGS. 1 to 3, two intake ports 30 and two exhaust ports 32 may be provided with respect to one cylinder 20.

The intake ports 30 and the exhaust ports 32 are coupled to the main combustion chamber 22. An intake valve (not illustrated) is provided at the intake ports 30. In accordance with the opening and closing of the intake valve, the intake ports 30 guide to the main combustion chamber 22 air that is supplied from the outside of the engine 1. An exhaust valve (not illustrated) is provided at the exhaust ports 32. In accordance with the opening and closing of the exhaust valve, the exhaust ports 32 discharge to the outside of the engine 1 combusted gas generated at the main combustion chamber 22.

The engine 1 further includes a partition member 40, a spacer 42, and a spark plug 44. The engine 1 includes an injector (not illustrated) that supplies fuel to the main combustion chamber 22.

As illustrated in FIGS. 1 to 3, the partition member 40 is provided at the cylinder head 12. As illustrated in FIG. 1, the partition member 40 is disposed at the cylinder head 12 near a central axis of the cylinder 20. The spark plug 44 is mounted to the partition member 40. As illustrated in FIGS. 2 and 3, the partition member 40 separates an auxiliary chamber 50 from the main combustion chamber 22.

Figure 4:
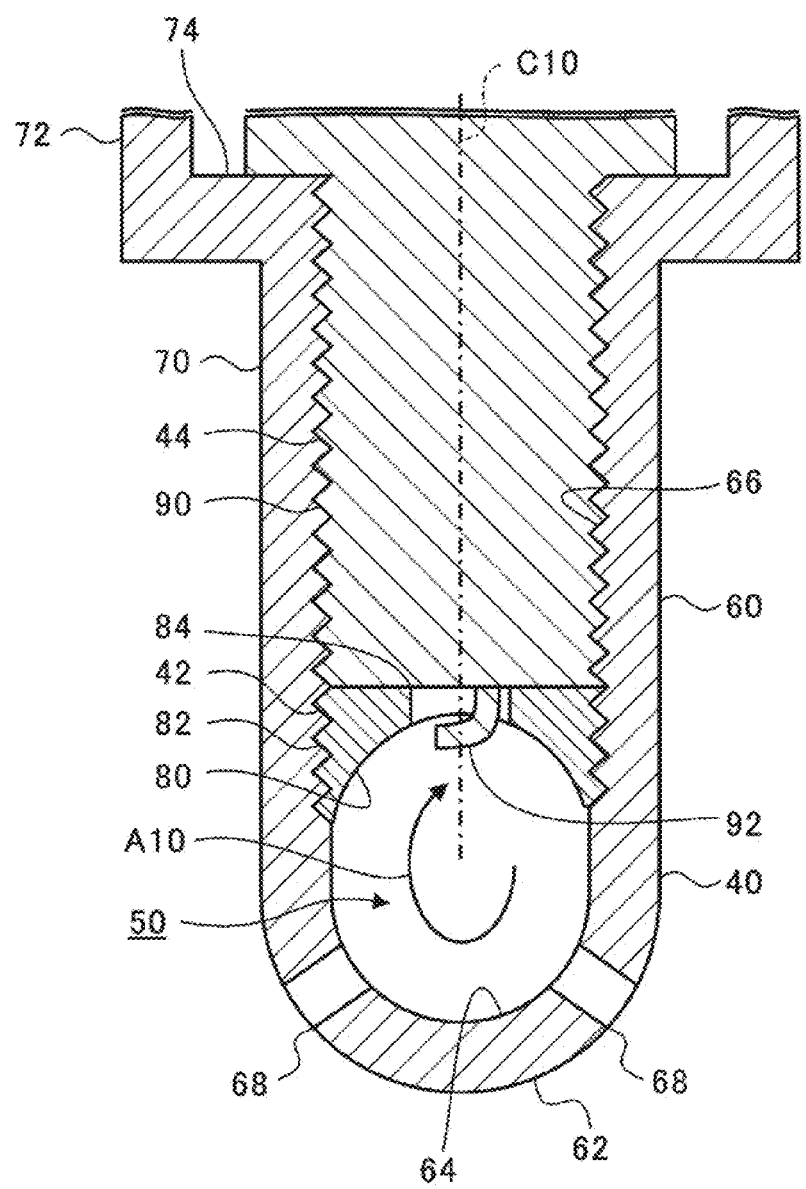
FIG. 4 is a partial enlarged sectional view illustrating the vicinity of an auxiliary chamber in an enlarged form.

FIG. 4 is a partial enlarged sectional view illustrating the vicinity of the auxiliary chamber 50 in an enlarged form. With reference to FIGS. 2 to 4, structures related to the auxiliary chamber 50 are described in detail below.

As illustrated in FIG. 4, the partition member 40 includes a body 60, an end portion 62, a first concave surface 64, an internal thread 66, and ventilation ports 68.

The body 60 has a cylindrical shape. For example, the inside diameter of the body 60 may change stepwise at a predetermined portion of the body 60 in the direction of a central axis C10 of the body 60. In more detail, the body 60 includes a small-diameter portion 70, a large-diameter portion 72, and a stepped portion 74. The inside diameter of the small-diameter portion 70 is smaller than the inside diameter of the large-diameter portion 72. A central axis of the small-diameter portion 70 and a central axis of the large-diameter portion 72 coincide with the central axis C10 of the body 60. One end of the small-diameter portion 70 in the direction of the central axis C10 is continuous with one end of the large-diameter portion 72 in the direction of the central axis C10 with the stepped portion 74 interposed therebetween.

The end portion 62 has a hemispherical shell shape at an end of the body 60. In more detail, the end portion 62 is disposed at an end of the small-diameter portion 70 on a side opposite to the large-diameter portion 72. The end portion 62 is continuous with the small-diameter portion 70 of the body 60. The hemispherical shell shape of the end portion 62 is not limited to an example of a perfectly hemispherical shell shape (an outer surface or an inner surface is a perfectly hemispherical shape), and may be, for example, a substantially hemispherical shell shape, a semi-ellipsoidal shell shape, or a dome shell shape, as long as the shape includes a curved shell.

The first concave surface 64 is disposed at the inner surface of the end portion 62 of the partition member 40. The first concave surface 64 may be a substantially hemispherical surface.

The internal thread 66 is disposed on an inner peripheral surface of the body 60. In more detail, the internal thread 66 is disposed on an inner peripheral surface of the small-diameter portion 70. The internal thread 66 is formed from a stepped-portion-74-side end of the small-diameter portion 70 to the vicinity of the end portion 62 of the body 60.

The ventilation ports 68 are formed through the end portion 62 having the hemispherical shell shape. In the example of FIG. 4, two ventilation ports 68 are provided in the partition member. However, the number of ventilation ports 68 is not limited to two and may be one or three or more.

The spacer 42 is disposed in the inside of the small-diameter portion 70 of the body 60 of the partition member 40. The spacer 42 is a block having an outer peripheral surface whose cross-sectional shape is a circular shape. The spacer 42 has a second concave surface 80, a first external thread 82, and a through hole 84.

The second concave surface 80 is disposed on a side facing the first concave surface 64 of the end portion 62 of the partition member 40. The second concave surface 80 may be a substantially hemispherical surface. Note that each substantially hemispherical surface that is the first concave surface 64 or the second concave surface 80 is not limited to an example of one having a perfectly hemispherical shape, and may be, for example, one having a shape formed by cutting a part of a spherical surface, a semi-ellipsoidal surface, or a dome curved surface, as long as the surface is curved.

The auxiliary chamber 50 is a space surrounded by the first concave surface 64 of the end portion 62 of the partition member 40, the inner peripheral surface of the body 60 of the partition member 40, and the second concave surface 80 of the spacer 42. The auxiliary chamber 50 is, for example, a space like a short circular cylinder being interposed between two hemispheres. The spacer 42 is disposed at a position where the capacity of the auxiliary chamber 50 becomes a previously provided design-based capacity.

Note that the auxiliary chamber 50 may be formed by the first concave surface 64 and the second concave surface 80 alone without using the inner peripheral surface of the body 60. In this case, an end-portion-62-side end of the spacer 42 may be positioned at an end-portion-62-side end of the body 60, and the auxiliary chamber 50 may be formed to have a substantially spherical shape.

In the engine 1 of the embodiment, by forming the first concave surface 64 at the end portion 62 of the partition member 40 and by forming the second concave surface 80 at the spacer 42, a mixture can smoothly flow in the auxiliary chamber 50 as indicated by arrow A10 in FIG. 4.

The first external thread 82 is disposed on the outer peripheral surface of the spacer 42. The first external thread 82 is capable of being screwed to the internal thread 66 of the body 60 of the partition member 40. By screwing the first external thread 82 of the spacer 42 to the internal thread 66 of the partition member 40, the spacer 42 is attached to the inside of the partition member 40.

Although described below, the spacer 42 is inserted into the partition member 40 from a side of the partition member 40 opposite to the end portion 62. The first external thread 82 of the spacer 42 and the internal thread 66 of the body 60 are screwed to each other from the stepped-portion-74-side end of the small-diameter portion 70 of the body 60.

Here, a target position of the spacer 42 when the spacer 42 is to be attached is a position of the spacer 42 where the capacity of the auxiliary chamber 50 becomes a previously provided design-based capacity. The internal thread 66 of the body 60 has a length that, when the spacer 42 reaches the target position in the inside of the partition member 40, allows the first external thread 82 of the spacer 42 to be tightened and stopped with respect to the internal thread 66 of the body 60 of the partition member 40.

Therefore, in the engine 1 of the embodiment, by simply screwing and tightening the threads until the spacer 42 is tightened and stopped, the spacer 42 can be disposed at the target position.

The through hole 84 is formed in the direction of the central axis C10 of the body 60 of the partition member 40, in other words, the direction of a central axis of the spacer 42.

Figure 5:
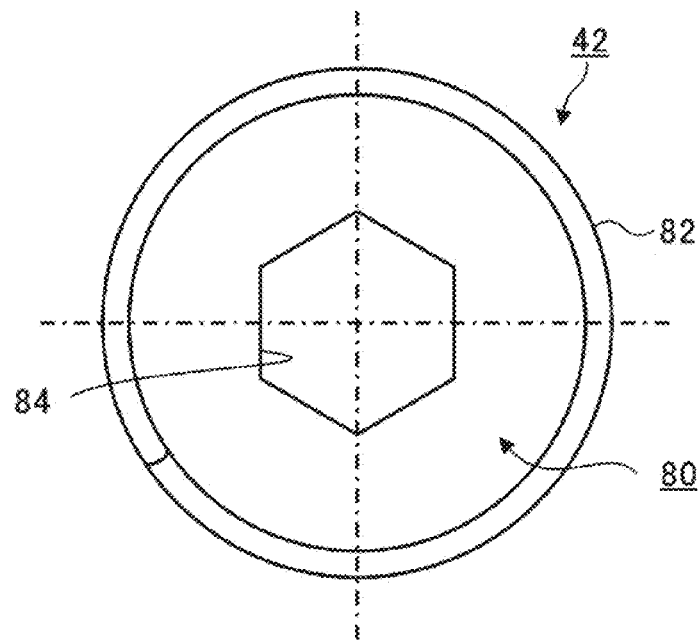
FIG. 5 is a plan view of a spacer when seen from a first-concave-surface side of a partition member.

FIG. 5 is a plan view of the spacer 42 when seen from a first-concave-surface-64 side of the partition member 40. As illustrated in FIG. 5, the cross-sectional shape of the through hole 84 of the spacer 42 is a hexagonal shape.

Therefore, in the engine 1 of the embodiment, a hexagonal wrench can be inserted into the through hole of the spacer 42. Consequently, in the engine 1 of the embodiment, the first external thread 82 of the spacer 42 can be easily screwed to the internal thread 66 of the body 60 of the partition member 40 by using the hexagonal wrench inserted into the through hole 84 of the spacer 42.

Note that the cross-sectional shape of the through hole 84 of the spacer 42 is not limited to a hexagonal shape, and may be any shape as long as the shape has three or more vertices, such as a triangular shape, a square shape, an octagonal shape, or a star shape. The cross-sectional shape of the through hole 84 of the spacer 42 is, preferably, a predetermined shape, and is, more preferably, a predetermined polygonal shape. "Predetermined shape" is a shape previously set in accordance with the shape of a tool for attaching the spacer 42, and "predetermined polygonal shape" is a polygonal shape previously set in accordance with the polygonal shape of the tool. That is, when a tool having a special cross-sectional shape is used, the cross-sectional shape of the through hole 84 of the spacer 42 may be a predetermined shape in correspondence with the shape of the tool.

In the engine 1 of the embodiment, when the cross-sectional shape of the through hole 84 of the spacer 42 is a predetermined polygonal shape, if a tool having a shape corresponding to the polygonal shape is used, the first external thread 82 of the spacer 42 can be easily screwed to the internal thread 66 of the body of the partition member 40.

The spark plug 44 includes a second external thread 90 and an electrode 92. The second external thread 90 is disposed on an outer peripheral surface of the spark plug 44. The second external thread 90 can be screwed to the internal thread 66 of the small-diameter portion 70 of the body 60.

Although described below, the spark plug 44 is attached to the partition member 40 from a side of the partition member 40 opposite to the end portion 62. The second external thread 90 of the spark plug 44 and the internal thread 66 of the body 60 are screwed to each other from the stepped-portion-74-side end of the small-diameter portion 70 of the body 60.

In the engine 1 of the embodiment, both the first external thread 82 of the spacer 42 and the second external thread 90 of the spark plug 44 can be screwed to the internal thread 66 of the body 60. Therefore, in the engine 1 of the embodiment, the spacer 42 and the spark plug 44 can be attached in substantially the same way, and thus the spacer 42 can be attached in a simplified manner.

When the spark plug 44 is mounted to the body 60 of the partition member 40, the electrode 92 of the spark plug 44 is inserted into the through hole 84 of the spacer 42. An end of the electrode 92 of the spark plug 44 may be exposed to the auxiliary chamber 50.

As illustrated in FIGS. 2 and 3, a predetermined electrical wire 94 may be coupled to a side of the spark plug 44 opposite to the auxiliary chamber 50. The cross-sectional shape of an end of the spark plug 44 on a side opposite to the auxiliary chamber 50 may be, for example, a hexagonal shape.

As illustrated in FIG. 2, the cylinder head 12 includes a mounting portion 100 to which the partition member 40 is mounted. The mounting portion 100 may have a key groove 102. In this case, the partition member 40 may include a projecting key portion 104 in correspondence with the key groove 102. The key portion 104 may be, for example, a part of an outer peripheral surface of the large-diameter portion 72 of the body 60.

Therefore, when the partition member 40 is to be mounted to the cylinder head 12, by fitting the key portion 104 of the partition member 40 to the key groove 102 of the mounting portion 100 of the cylinder head 12, the partition member 40 can be easily positioned.

As illustrated in FIG. 3, the partition member 40 may be fixed to the cylinder head 12 by a fixing member 110. The fixing member 110 may include a bolt. For example, the large-diameter portion 72 of the body 60 of the partition member 40 may be provided with a flange 112, and the flange 112 may be fixed to the cylinder head 12 by the bolt serving as the fixing member 110.

As illustrated in FIGS. 2 and 3, the partition member 40 is provided with respect to the cylinder head 12 such that the end portion 62 of the partition member 40 is exposed to the main combustion chamber 22. As illustrated in FIG. 2, the ventilation ports 68 cause the main combustion chamber 22 and the auxiliary chamber 50 to communicate with each other.

Air and fuel supplied to the main combustion chamber 22 are supplied to the auxiliary chamber 50 through the ventilation ports 68. The air and the fuel supplied to the auxiliary chamber 50 are sufficiently mixed in the auxiliary chamber 50. The spark plug 44 ignites the mixture in the auxiliary chamber 50 to combust the mixture. Explosion caused by the combustion of the mixture is transmitted to the main combustion chamber 22 through the ventilation ports 68. The explosion of the mixture in the main combustion chamber 22 causes the piston 14 to slide.

Method of Producing Engine

Figure 6:
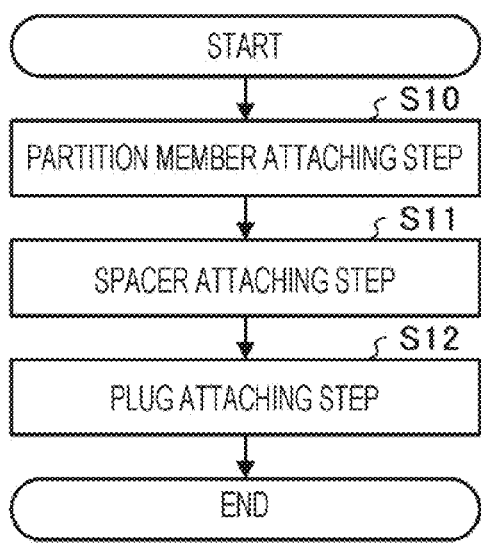
FIG. 6 is a flowchart illustrating the flow of a method of producing the engine according to the embodiment.

FIG. 6 is a flowchart illustrating the flow of a method of producing the engine 1 according to the embodiment. For convenience of explanation, the method of producing the engine 1 according to the embodiment may be called the producing method.

As illustrated in FIG. 6, the producing method includes a partition member attaching step (S10), a spacer attaching step (S11), and a plug attaching step (S12). Each step of the producing method may be performed by a human being, or by a machine, or by both a human being and a machine.

Partition Member Attaching Step (S10): Third Step

In the partition member attaching step (S10), the partition member 40 is attached to the cylinder head 12 of the engine 1. In more detail, in the partition member attaching step (S10), the partition member 40 is accommodated in the mounting portion 100 of the cylinder head 12 of the engine 1. Here, by fitting the key portion 104 of the partition member 40 to the key groove 102 of the mounting portion 100, the partition member 40 is positioned with respect to the cylinder head 12. By using the bolt serving as the fixing member 110, the flange 112 of the partition member 40 is fixed to the cylinder head 12. In this way, the partition member 40 is mounted to the cylinder head 12.

Spacer Attaching Step (S11): First Step

After the partition member attaching step (S10), the spacer attaching step (S11) is performed. In the spacer attaching step (S11), by screwing the first external thread 82 of the spacer 42 and the internal thread 66 of the body 60 of the partition member 40 to each other, the spacer 42 is attached to the inside of the body 60 of the partition member 40.

In more detail, in the spacer attaching step (S11), the spacer 42 is inserted into the body 60 of the partition member 40 from a side opposite to the end portion 62 of the partition member 40 mounted to the cylinder head 12. Here, the spacer 42 is inserted with the second concave surface 80 facing the first concave surface 64 of the end portion 62 of the partition member 40, in other words, with the second concave surface 80 facing the direction of insertion of the spacer 42.

In the spacer attaching step (S11), a tool (for example, a hexagonal wrench) having a shape corresponding to the shape of the through hole 84 of the spacer 42 is fitted to the through hole 84 of the spacer 42. With the tool being fitted to the through hole 84 of the spacer 42, the tool is rotated around the central axis C10 of the body 60. Therefore, while rotating around the central axis C10, the spacer 42 moves toward the end portion 62 from a large-diameter-portion-72-side end of the small-diameter portion 70 of the body 60. That is, the spacer 42 moves toward the end portion 62 while the first external thread 82 and the internal thread 66 are being screwed to each other.

When the tool that rotates the spacer 42 stops, that is, when the first external thread 82 is tightened and stopped with respect to the internal thread 66, the tool is removed from the through hole 84 of the spacer 42. In this way, the spacer 42 is disposed at a target position.

Plug Attaching Step (S12): Second Step

After the spacer attaching step (S11), the plug attaching step (S12) is performed. In the plug attaching step (S12), by screwing the second external thread 90 of the spark plug 44 and the internal thread 66 of the body 60 of the partition member 40 to each other, the spark plug 44 is attached to the partition member 40.

In more detail, in the plug attaching step (S12), the spark plug 44 is inserted into the body 60 of the partition member 40 from a side opposite to the end portion 62 of the partition member 40 to which the spacer 42 has been attached. Here, the spark plug 44 is inserted with the electrode 92 facing the direction of insertion of the spark plug 44.

In the plug attaching step (S12), for example, a tool, such as a hexagonal socket, may be attached to an end of the spark plug 44 on a side opposite to the electrode 92, and the tool may be rotated around the central axis C10. Therefore, while rotating around the central axis C10, the spark plug 44 moves toward the end portion 62 from the large-diameter-portion-72-side end of the small-diameter portion 70 of the body 60. That is, the spark plug 44 moves toward the end portion 62 while the second external thread 90 and the internal thread 66 are being screwed to each other.

When the tool that rotates the spark plug 44 stops, that is, when the second external thread 90 is tightened and stopped with respect to the internal thread 66, the tool is removed from the spark plug 44. In this way, the spark plug 44 contacts the spacer 42, and the electrode 92 is inserted into the through hole 84 of the spacer 42. Thereafter, the predetermined electrical wire 94 is coupled to an end of the spark plug 44 on a side opposite to the electrode 92.

As described above, the producing method includes the first step of attaching the spacer 42 to the inside of the body 60 of the partition member 40 by screwing the first external thread 82 of the spacer 42 and the internal thread 66 of the body 60 of the partition member 40 to each other (for example, the spacer attaching step (S11)). The producing method includes the second step of, after the first step, attaching the spark plug 44 to the partition member 40 by screwing the second external thread 90 of the spark plug 44 and the internal thread 66 of the body 60 of the partition member 40 to each other (for example, the plug attaching step (S12)).

Therefore, in the producing method, the engine 1 including the auxiliary chamber 50 having a shape close to a spherical shape can be consequentially produced easily by performing a simple operation of screwing the first external thread 82 of the spacer 42 and the internal thread 66 of the body 60 of the partition member 40 to each other. Consequently, according to the producing method, it is possible to suppress an increase in production costs of the engine 1.

The producing method further includes the third step of attaching the partition member 40 to the cylinder head 12 of the engine 1 (for example, the partition member attaching step (S10)), and the first step may be performed after the third step.

Therefore, in the producing method, when the spacer 42 is to be attached to the partition member 40, the partition member 40 is supported by the cylinder head 12. Consequently, in the producing method, the first external thread 82 of the spacer 42 can be easily screwed to the internal thread 66 of the partition member 40 without providing a dedicated jig that supports the partition member 40 when the spacer 42 is to be attached.

Note that, in the embodiment, an example in which the spacer attaching step (S11) is performed after the partition member attaching step (S10) has been described. However, the order of the steps is not limited to such an example, and the partition member attaching step (S10) may be performed after the spacer attaching step (S11) and the plug attaching step (S12). That is, first, the spacer 42 may be attached to the partition member 40 that is not attached to the cylinder head 12 (S11: first step), then, the spark plug 44 may be attached to the partition member 40 to which the spacer 42 has been attached (S12: second step), and then, the partition member 40 to which the spacer 42 and the spark plug 44 have been attached may be attached to the cylinder head 12 (S10: third step). Alternatively, the spacer 42 may be attached to the partition member 40 that is not attached to the cylinder head 12 (S11: first step), the partition member 40 to which the spacer 42 has been attached may be attached to the cylinder head 12 (S10: third step), and then, the spark plug 44 may be attached (S12: second step).

In the embodiment, an example of producing a new engine 1 has been described. However, for example, at the time of research and development of the engine 1, specifications, such as the capacity or the shape, of the auxiliary chamber 50 may be changed. In such a case, a spacer 42 that has been already mounted to the partition member 40 may be replaced by a different spacer 42 having a differently shaped second concave surface 80. That is, the producing method is not limited to the case of producing a new engine 1, and can be applied even at the time of research and development of the engine 1 or when reassembling the engine 1.

Although the embodiment of the disclosure has been described above with reference to the attached drawings, the disclosure is not limited to such an embodiment. It is apparent to those skilled in the art that various changes or corrections can be made within the scope of the claims and that such changes or corrections naturally fall within the technical scope of the disclosure.

According to the embodiment of the disclosure, it is possible to suppress an increase in production costs.

The invention claimed is:

1. A method of producing an engine, the engine comprising a partition member separating an auxiliary chamber from a main combustion chamber, a spacer that is disposed in an inside of the partition member, and a spark plug that is mounted to the partition member, the partition member comprising a cylindrical body, a hemispherical-shell-shaped end portion that is disposed at an end of the body, a first concave surface that is disposed at an inner surface of the end portion of the partition member, and an internal thread that is disposed on an inner peripheral surface of the body, the spacer having a second concave surface that is disposed on a side facing the first concave surface of the end portion of the partition member, and a first external thread that is disposed on an outer peripheral surface of the spacer and that is screwable to the internal thread of the body, the spark plug having a second external thread that is disposed on an outer peripheral surface of the spark plug and that is screwable to the internal thread of the body, the method comprising:

a first step of attaching the spacer to an inside of the body of the partition member by screwing the first external thread of the spacer and the internal thread of the body of the partition member to each other; and a second step of, after the first step, attaching the spark plug to the partition member by screwing the second external thread of the spark plug and the internal thread of the body of the partition member to each other.

2. The method of producing the engine according to claim 1, wherein the internal thread of the body of the partition member has a length that, when the spacer that is attached in the first step reaches a target position in the inside of the partition member, allows the first external thread of the spacer to be tightened and stopped with respect to the internal thread of the body of the partition member.

3. The method of producing the engine according to claim 1, wherein
the spacer has a through hole that is formed in a direction of a central axis of the body of the partition member, and
a cross-sectional shape of the through hole is a predetermined polygonal shape.

4. The method of producing the engine according to claim 1, further comprising:
a third step of attaching the partition member to a cylinder head of the engine,
wherein the first step is performed after the third step.

* * * * *